United States Patent
Yokoyama et al.

(10) Patent No.: US 12,086,994 B2
(45) Date of Patent: Sep. 10, 2024

(54) INFORMATION PROCESSING APPARATUS, INFORMATION PROCESSING METHOD, AND PROGRAM

(71) Applicant: Sony Group Corporation, Tokyo (JP)

(72) Inventors: Suguru Yokoyama, Tokyo (JP); Hironori Hattori, Tokyo (JP); Yuya Yamashita, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/771,719

(22) PCT Filed: Nov. 9, 2020

(86) PCT No.: PCT/JP2020/041734
§ 371 (c)(1),
(2) Date: Apr. 25, 2022

(87) PCT Pub. No.: WO2021/100516
PCT Pub. Date: May 27, 2021

(65) Prior Publication Data
US 2022/0405943 A1 Dec. 22, 2022

(30) Foreign Application Priority Data
Nov. 22, 2019 (JP) .................................. 2019-211520

(51) Int. Cl.
*G06T 7/215* (2017.01)
*G06V 20/40* (2022.01)
(Continued)

(52) U.S. Cl.
CPC .............. *G06T 7/215* (2017.01); *G06V 20/46* (2022.01); *G06V 40/103* (2022.01); *G06V 40/23* (2022.01)

(58) Field of Classification Search
CPC ........... G06T 7/215; G06T 2207/30224; G06T 2207/30241; G06T 7/246; G06V 20/46;
(Continued)

(56) References Cited

U.S. PATENT DOCUMENTS

| 2009/0067670 A1 | 3/2009 | Johnson et al. |
| 2017/0083769 A1* | 3/2017 | Van Rensburg ....... H04N 5/772 |
| 2022/0044423 A1* | 2/2022 | Tsizin-Goldman .... G06V 20/42 |

FOREIGN PATENT DOCUMENTS

| CN | 102148919 A | 8/2011 |
| CN | 103019024 A | 4/2013 |

(Continued)

OTHER PUBLICATIONS

Jonas Tebbe, "Spin detection in Robotic Table Tennis" (Year: 2019).*

(Continued)

*Primary Examiner* — Dhaval V Patel
(74) *Attorney, Agent, or Firm* — Oblon, McClelland, Maier & Neustadt, L.L.P.

(57) ABSTRACT

The present technology relates to an information processing apparatus, an information processing method, and a program capable of easily setting a frame for starting predetermined processing in a moving image of a play in a ball game.
The information processing apparatus includes: an analysis unit that detects a trajectory of a ball in a first moving image; and a start frame setting unit that sets a start frame for starting predetermined processing among frames of the first moving image on the basis of a detection result of the trajectory of the ball in the first moving image. The present technology can be applied to, for example, a system that analyzes a rotation characteristic of a serve in table tennis.

20 Claims, 13 Drawing Sheets

(51) Int. Cl.
*G06V 40/10* (2022.01)
*G06V 40/20* (2022.01)

(58) Field of Classification Search
CPC ...... G06V 40/103; G06V 40/23; G06V 10/62; G06V 20/42; A63B 69/00
See application file for complete search history.

(56) References Cited

FOREIGN PATENT DOCUMENTS

| CN | 107773961 A | 3/2018 |
|---|---|---|
| JP | 2010-239169 A | 10/2010 |
| JP | 2015-82817 A | 4/2015 |

OTHER PUBLICATIONS

International Search Report mailed on Jan. 12, 2021 in PCT/JP2020/041734 filed on Nov. 9, 2020 (3 pages).
Yoshito Nishita et al., "Research for Improving Tactics in Tennis Doubles", vol. 65, No. 7, pp. 983-993, 2011.
Junichi Okamura et al., "Fast tracking imaging system", Monthly Magazine Broadcast Engineering, May issue, Kenroku Kan Publishing Co., Ltd., vol. 5, pp. 118-121, 2015.
Sho Tamaki et al., "Measuring ball spin using ball mark and the motion model of a ball", Image lab, vol. 27, No. 7, pp. 34-40, 2016.
Masato Ikeguchi et al., "Prediction of hitting points considering the movement of a human racket for a table tennis robot", The 35th Annual Conference of the Robotics Society of Japan, The Robotics Society of Japan, 2017, (4 total pages).

* cited by examiner

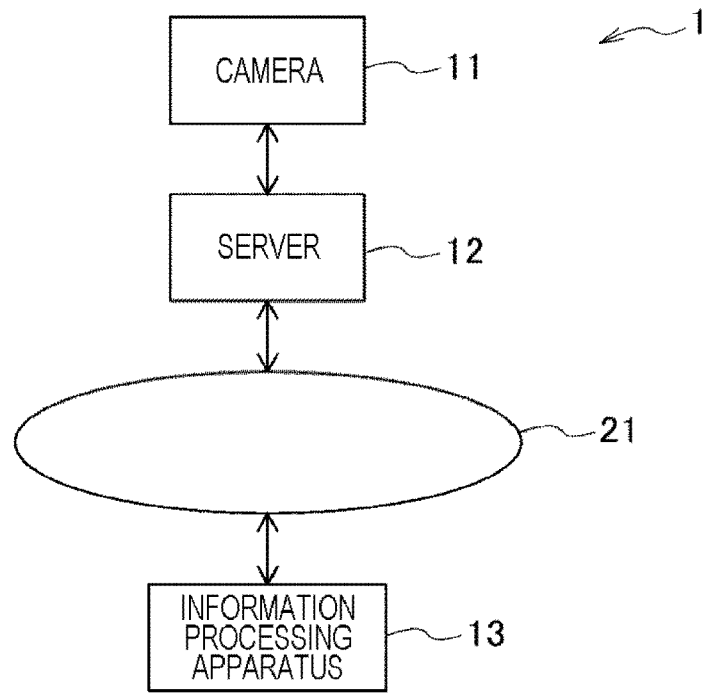
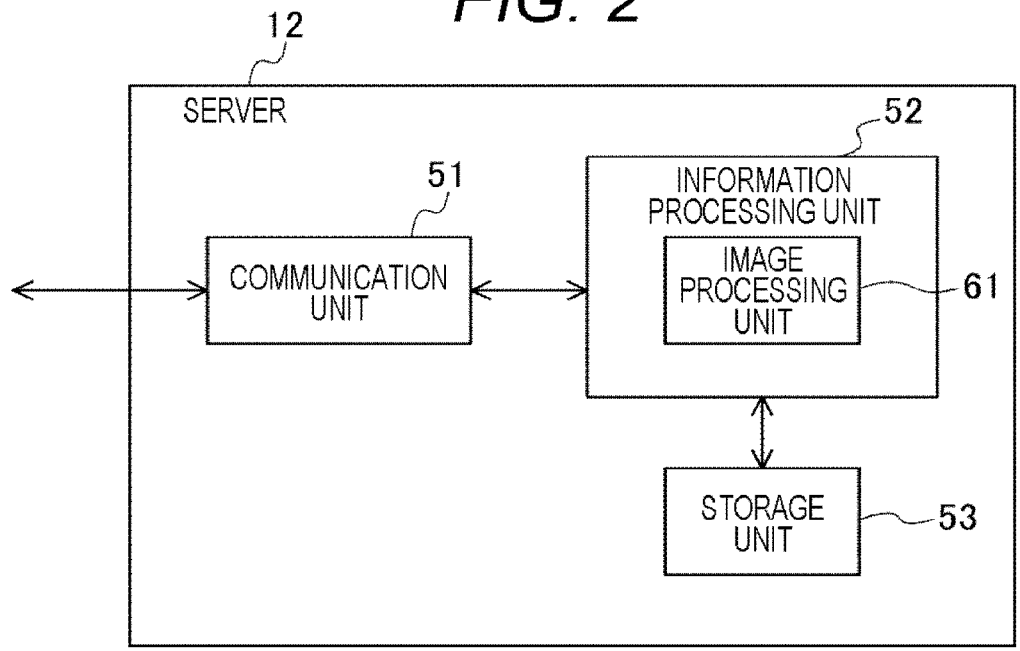

INFORMATION PROCESSING APPARATUS, INFORMATION PROCESSING METHOD, AND PROGRAM

TECHNICAL FIELD

The present technology relates to an information processing apparatus, an information processing method, and a program, and more particularly, to an information processing apparatus, an information processing method, and a program that perform processing of a moving image of a play in a ball game.

BACKGROUND ART

For example, in a case where the rotation characteristic of a ball is analyzed immediately after hitting the ball in a ball game such as table tennis, in order to improve an analysis accuracy, it is desirable to detect a frame capturing the moment of impact of the ball from a moving image obtained by imaging a play in the ball game and perform detection processing with reference to the frame.

On the other hand, conventionally, a person usually visually searches for the corresponding frame. However, for example, in a case where the moving image has a high frame rate, the number of frames becomes enormous, and it becomes difficult to detect the corresponding frame.

On the other hand, conventionally, a technology has been proposed in which a motion pattern is detected on the basis of sensor data from a sensor attached to a user or an object in contact with the user, and an image at the moment of impact of the ball is selected on the basis of the motion pattern (see, for example, Patent Document 1).

Furthermore, conventionally, a technology has been proposed in which a positional relationship between a club head and a ball is calculated on the basis of a motion vector of a golf club head, and the moment of impact is predicted on the basis of the calculated positional relationship (see, for example, Patent Document 2).

CITATION LIST

Patent Document

Patent Document 1: Japanese Patent Application Laid-Open No. 2015-82817
Patent Document 2: Japanese Patent Application Laid-Open No. 2010-239169

SUMMARY OF THE INVENTION

Problems to be Solved by the Invention

However, in the technology described in Patent Document 1, it is necessary to attach the sensor to the user or the object in contact with the user.

Furthermore, in the technology described in Patent Document 2, a method of predicting the moment of impact in the ball game such as table tennis in which a moving ball is hit has not been specifically studied.

The present technology has been made in view of such a situation, and is to make it possible to easily set a frame of starting predetermined processing in a moving image of a play in a ball game.

Solutions to Problems

An information processing apparatus according to one aspect of the present technology includes: an analysis unit that detects a trajectory of a ball in a first moving image; and a start frame setting unit that sets a start frame for starting predetermined processing among frames of the first moving image on the basis of a detection result of the trajectory of the ball in the first moving image.

An information processing method according to one aspect of the present technology is performed by an information processing apparatus. The method includes: detecting a trajectory of a ball in a moving image; and setting a start frame for starting predetermined processing among frames of the moving image on the basis of a detection result of the trajectory of the ball in the moving image.

A program according to one aspect of the present technology causes a computer to execute a process including: detecting a trajectory of a ball in a moving image; and setting a start frame for starting predetermined processing among frames of the moving image on the basis of a detection result of the trajectory of the ball in the moving image.

In one aspect of the present technology, a trajectory of a ball is detected in a moving image, and a start frame for starting predetermined processing is set among frames of the moving image on the basis of a detection result of the trajectory of the ball in the moving image.

BRIEF DESCRIPTION OF DRAWINGS

FIG. 1 is a block diagram illustrating a configuration example of an information processing system to which the present technology is applied.

FIG. 2 is a block diagram illustrating a configuration example of functions of a server.

MODE FOR CARRYING OUT THE INVENTION

Figure 3:
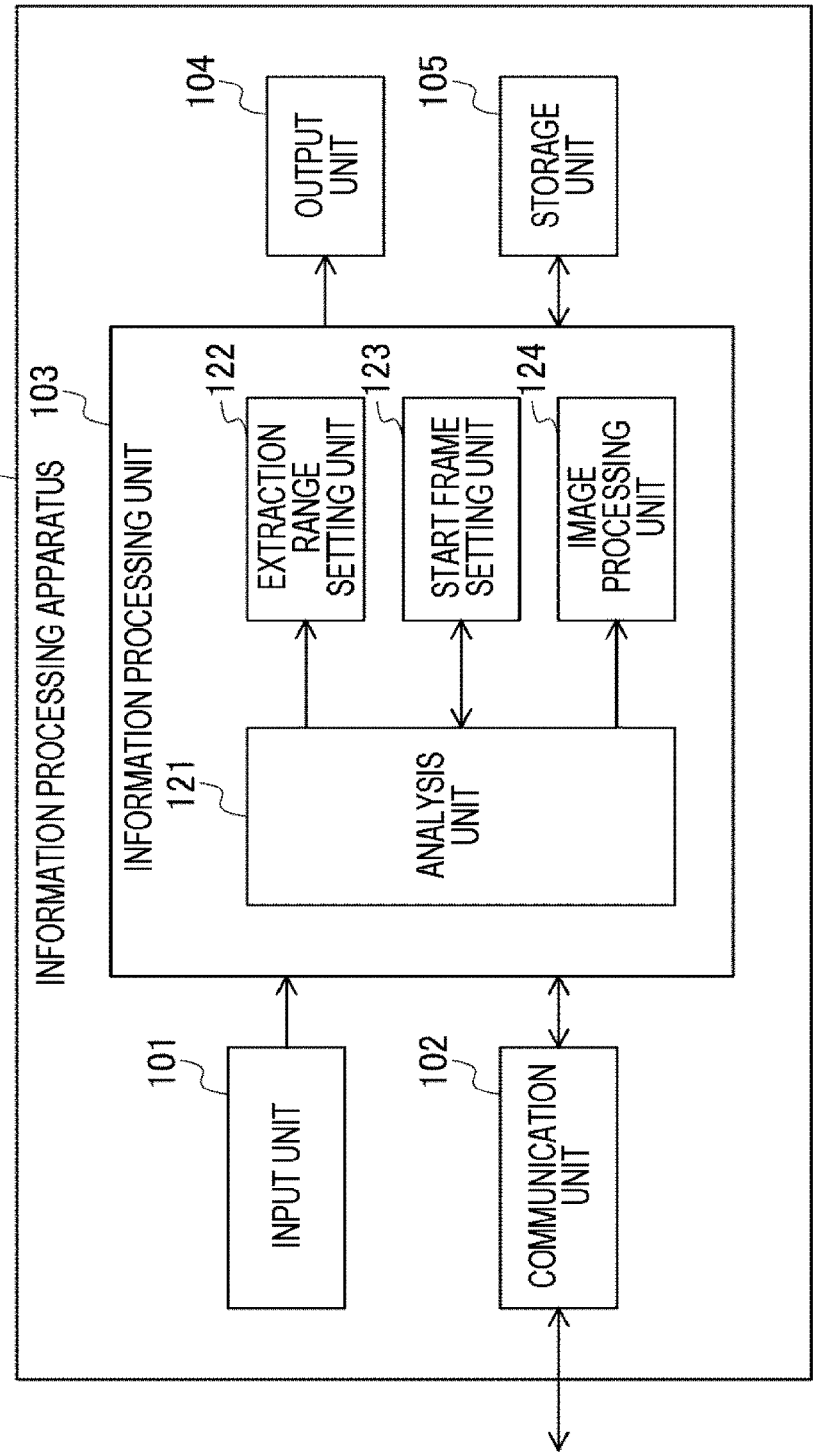
FIG. 3 is a block diagram illustrating a configuration example of functions of an information processing apparatus.

Hereinafter, modes for carrying out the present technology will be described. The description will be given in the following order.
1. Embodiment
2. Modification
3. Others

1. Embodiment

An embodiment of the present technology will be described with reference to FIGS. 1 to 13.

<Configuration Example of Information Processing System>

FIG. 1 is a block diagram illustrating an embodiment of an information processing system 1 to which the present technology is applied.

The information processing system 1 is, for example, a system that images a play in a ball game, performs processing such as analysis and editing of a captured moving image generated from the obtained captured image.

Note that in this description, the ball game refers to a sport that uses a ball in a broad sense including a shuttle cock of badminton, a puck of ice hockey, and the like.

The information processing system 1 includes a camera 11, a server 12, and an information processing apparatus 13. The server 12 and the information processing apparatus 13 are connected to each other via a network 21.

The camera 11 images the play in the ball game at a high frame rate (for example, 960p) and records a sound. The camera 11 generates a captured moving image including the sound recorded simultaneously with the imaging, that is, the sound corresponding to the moving image (hereinafter, referred to as a recorded sound), and transmits the captured moving image to the server 12.

The server 12 accumulates the captured moving image supplied from the camera 11. Furthermore, the server 12 generates a sub-clip that is a moving image obtained by extracting a part of the captured moving image. Moreover, the server 12 converts the frame rate of the captured moving image to generate a moving image of a low frame rate (for example, 60i) (hereinafter, referred to as an LFR moving image) in which a frame rate is reduced. The server 12 transmits various moving images to the information processing apparatus 13 via the network 21.

The information processing apparatus 13 generates information requesting transmission of various moving images, transmits the information to the server 12 via the network 21, and receives the requested moving images from the server 12. Furthermore, the information processing apparatus 13 performs processing such as analysis and editing of the received moving images.

<Configuration Example of Functions of Server 12>

FIG. 2 illustrates a configuration example of functions of the server 12.

The server 12 includes a communication unit 51, an information processing unit 52, and a storage unit 53.

The communication unit 51 performs communication with the camera 11 and communication with the information processing apparatus 13 via the network 21. For example, the communication unit 51 receives a captured moving image from the camera 11 and supplies the captured moving image to the information processing unit 52.

Furthermore, for example, the communication unit 51 transmits various moving images acquired from the information processing unit 52 to the information processing apparatus 13 via the network 21.

Note that a communication method of the communication unit 51 is random. Furthermore, the communication unit 51 can support a plurality of communication methods.

The information processing unit 52 controls each unit of the server 12 and performs various types of information processing. The information processing unit 52 includes an image processing unit 61.

The image processing unit 61 generates an LFR moving image by converting the frame rate of the captured moving image. The image processing unit 61 supplies the generated LFR moving image to the communication unit 51 or stores the generated LFR moving image in the storage unit 53.

Furthermore, the image processing unit 61 generates a sub-clip by extracting a part of the captured moving image. The image processing unit 61 supplies the sub-clip to the communication unit 51 or stores the sub-clip in the storage unit 53.

The storage unit 53 includes, for example, nonvolatile and volatile memories, and stores various types of programs and data used for processing of the server 12.

<Configuration Example of Functions of Information Processing Apparatus 13>

FIG. 3 illustrates a configuration example of functions of the information processing apparatus 13.

The information processing apparatus 13 includes an input unit 101, a communication unit 102, an information processing unit 103, an output unit 104, and a storage unit 105.

The input unit 101 includes an input device such as a keyboard, a mouse, or a microphone, and supplies the input data to the information processing unit 103.

The communication unit 102 communicates with the server 12 via the network 21. For example, the communication unit 102 transmits, to the server 12, the information requesting transmission of various moving images, and receives the requested moving images from the server 12. Furthermore, for example, the communication unit 102 can also communicate with other devices not included in the information processing system 1.

Note that a communication method of the communication unit 102 is random. Furthermore, the communication unit 102 can support a plurality of communication methods.

The information processing unit 103 controls each unit of the information processing apparatus 13 and performs various types of information processing. The information processing unit 103 includes an analysis unit 121, an extraction range setting unit 122, a start frame setting unit 123, and an image processing unit 124.

The analysis unit 121 performs various analysis processes on various moving images. For example, the analysis unit 121 analyzes the play in the ball game. Furthermore, for example, the analysis unit 121 analyzes the recorded sound included in the moving image. The analysis unit 121 supplies information indicating the analysis result to the extraction range setting unit 122, the start frame setting unit 123, the image processing unit 124, and the output unit 104 as necessary, or stores the information in the storage unit 105.

The extraction range setting unit 122 sets an extraction range for extracting a sub-clip on the basis of the analysis result of the LFR moving image and the like. The extraction range setting unit 122 supplies, to the communication unit 102, information including the extraction range and requesting transmission of the sub-clip.

The start frame setting unit 123 sets a start frame for starting the analysis of the play in the ball game on the basis of the analysis result of the sub-clip. The start frame setting unit 123 supplies information indicating the start frame to the analysis unit 121.

The image processing unit 124 edits the moving image on the basis of the instruction and the like of a user input to the input unit 101. The image processing unit 124 supplies the edited moving image to the communication unit 102 and the output unit 104 or stores the edited moving image in the storage unit 105 as necessary.

The output unit 104 includes, for example, an output device such as a display or a speaker, and displays the moving image or outputs the sound accompanying the moving image.

The storage unit 105 includes, for example, nonvolatile and volatile memories, and stores various types of programs and data used for processing of the information processing apparatus 13.

<Moving Image Editing Process>

Figure 4:
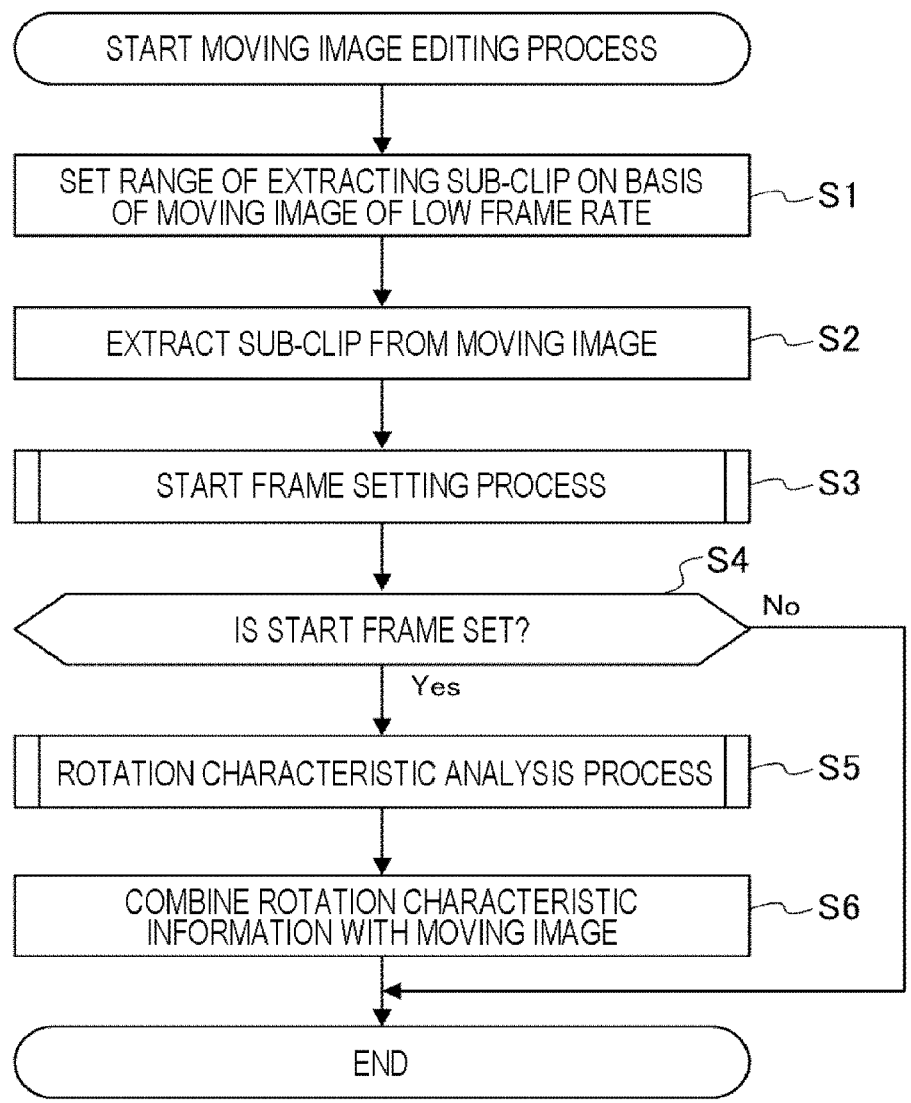
FIG. 4 is a flowchart for explaining a moving image editing process executed by the information processing system.

Next, a moving image editing process executed by the information processing system 1 will be described with reference to a flowchart of FIG. 4.

Hereinafter, a process of analyzing the rotation characteristic of a serve on the basis of a captured moving image of a high frame rate obtained by imaging a table tennis play with the camera 11 and combining rotation information indicating the rotation characteristic of the serve with the moving image will be described as a specific example. Note that it is assumed that the captured moving image has already been captured and is stored in the storage unit 53 of the server 12.

In step S1, the information processing system 1 sets a range of extracting a sub-clip on the basis of a moving image (LFR moving image) of a low frame rate.

Specifically, the analysis unit 121 of the information processing apparatus 13 generates information requesting transmission of the LFR moving image, and transmits the information to the server 12 via the communication unit 102 and the network 21.

On the other hand, the image processing unit 61 of the server 12 receives the information requesting transmission of the LFR moving image via the communication unit 51. The image processing unit 61 converts the captured moving image of a high frame rate stored in the storage unit 53 into the LFR moving image of a low frame rate. Furthermore, the image processing unit 61 transmits the LFR moving image to the information processing apparatus 13 via the communication unit 51 and the network 21.

Note that the LFR moving image also includes the recorded sound corresponding to the captured moving image. Furthermore, the image processing unit 61 may perform processing such as lowering a sampling rate on the recorded sound.

On the other hand, the information processing unit 103 of the information processing apparatus 13 receives the LFR moving image via the communication unit 102. The extraction range setting unit 122 sets a range in which the sub-clip is extracted from the captured moving image on the basis of the LFR moving image.

Here, an example of a method of setting the extraction range of the sub-clip will be described.

For example, the analysis unit 121 analyzes at least one of the LFR moving image or the recorded sound, and the extraction range setting unit 122 sets the extraction range of the sub-clip on the basis of the analysis result.

For example, the analysis unit 121 detects the trajectory of a ball by tracking the ball in the LFR moving image. The analysis unit 121 detects the frame of the LFR moving image at the moment of the impact of the serve or immediately after the moment on the basis of a change in the trajectory of the ball.

Figure 5:
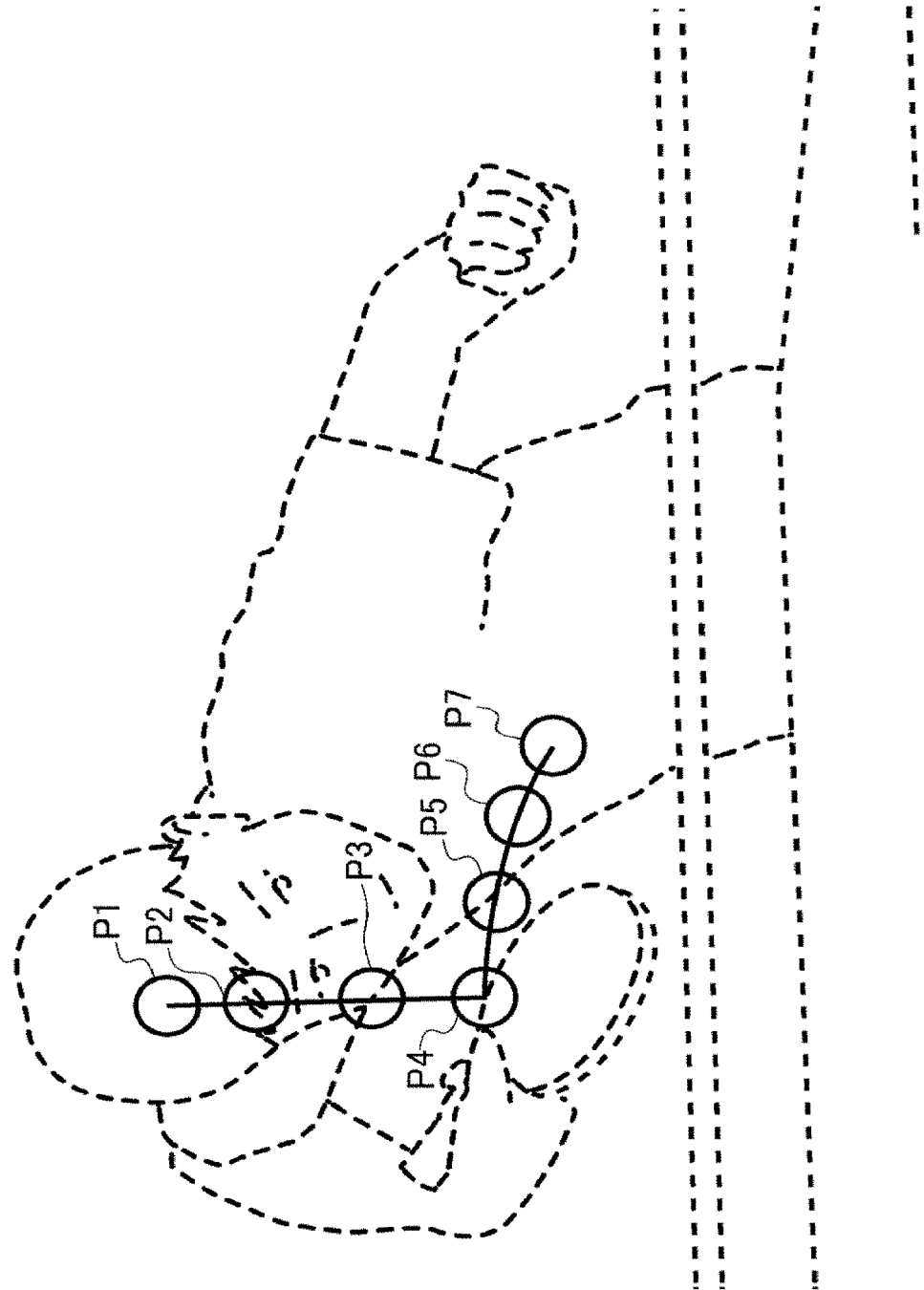
FIG. 5 is a diagram illustrating an example of a trajectory of a ball at a moment of serving.

FIG. 5 illustrates an example of the trajectory of the ball at the moment of serving in table tennis.

When hitting a serve, a table tennis player throws up the ball and then hits the falling ball. Therefore, before hitting a racket, the ball falls in a vertical direction as indicated by positions P1 to P4 in FIG. 5. Then, in a case where the serve is hit when the ball reaches the position P4, the traveling direction of the ball changes, and the ball moves in a direction indicated by positions P4 to P7.

For example, the analysis unit 121 detects a change point at which the traveling direction of the ball changes by a predetermined angle or more in the LFR moving image, thereby detecting the frame of the LFR moving image at the moment (the moment of impact) when the ball is hit at the position P4 or immediately after the moment.

However, since the LFR moving image has the low frame rate, the LFR moving image does not necessarily include a frame that captures the moment of impact. Therefore, the analysis unit 121 may be able to detect only an approximate impact moment.

The analysis unit 121 supplies information indicating the detected frame of the LFR moving image to the extraction range setting unit 122. The extraction range setting unit 122 sets, as an extraction range, a range of a predetermined number of frames before and after the frame of the HFR moving image corresponding to the detected frame of the LFR moving image.

Note that, for example, the user may detect the frame at the moment of the impact of the serve or immediately after the moment while viewing the LFR moving image.

Furthermore, for example, a venue is usually quiet immediately before serving. Therefore, for example, the analysis unit 121 detects the time of the moment when the venue calms down by analyzing the recorded sound, and supplies information indicating the detection result to the extraction range setting unit 122. The time at the moment when the venue calms down is assumed to be slightly before the impact of the serve. The extraction range setting unit 122 sets, as the extraction range, a predetermined range before and after the frame of the HFR moving image after a predetermined time elapses from the detected time.

Moreover, for example, in a case where the serve is followed by a rally, a ball-hitting sound and a rebound sound occur with a certain degree of regularity from an initial ball-hitting sound. Therefore, for example, in a case where the analysis unit 121 analyzes the recorded sound and detects the ball-hitting sound and the rebound sound occurring with a certain degree of regularity, the analysis unit detects the time when the initial ball-hitting sound occurs and supplies information indicating the detection result to the extraction range setting unit 122. It is assumed that the time when the initial ball-hitting sound occurs is substantially the same time as the moment of the impact of the serve. The extraction range setting unit 122 sets, as the extraction range, a predetermined range before and after the frame of the HFR moving image at the detected time.

Furthermore, for example, the analysis unit 121 may recognize at least one of the action or the posture of the player by analyzing the LFR moving image, and the extraction range setting unit 122 may set the extraction range on the basis of the recognition result of at least one of the action or the posture of the player.

For example, among table tennis players, there are many players who perform a determined action (routine) immediately before serving. Therefore, for example, in a case where the analysis unit 121 analyzes the LFR moving image and detects the routine of the player, the analysis unit detects the time when the routine ends, and supplies information indicating the detection result to the extraction range setting unit 122. The time when the routine ends is assumed to be slightly before the impact of the serve. The extraction range setting unit 122 sets, as the extraction range, a predetermined range before and after the frame of the HFR moving image after a predetermined time elapses from the detected time.

Furthermore, for example, the analysis unit 121 performs bone recognition of the player on the basis of the LFR moving image, and detects the movement of the bone of the player. Then, the analysis unit 121 detects the frame of the LFR moving image at the moment of the impact of the serve or immediately after the moment on the basis of the movement of the bone of the player. The analysis unit 121 supplies information indicating the detected frame of the LFR moving image to the extraction range setting unit 122. The extraction range setting unit 122 sets, as the extraction range, a predetermined range before and after the frame corresponding to the detected LFR moving image frame in the HFR moving image.

Note that the extraction range of the sub-clip may be set by combining some of the methods described above.

Furthermore, hereinafter, the number of frames of the sub-clip (the number of frames within the extraction range) is Fmax, the frame number of the head frame of the sub-clip is 1, and the frame number of the last frame is Fmax.

The extraction range setting unit 122 transmits, via the communication unit 102 and the network 21, information including the extraction range of the sub-clip and requesting transmission of the sub-clip.

On the other hand, the image processing unit 61 of the server 12 receives the information requesting transmission of the sub-clip via the communication unit 51.

In step S2, the server 12 extracts the sub-clip from the captured moving image.

Specifically, the image processing unit 61 extracts, as the sub-clip, a moving image in the extraction range set by the extraction range setting unit 122 from the captured moving image. The image processing unit 61 transmits the extracted sub-clip to the information processing apparatus 13 via the communication unit 51 and the network 21.

On the other hand, the information processing unit 103 of the information processing apparatus 13 receives the sub-clip via the communication unit 102.

In step S3, the information processing unit 103 executes a start frame setting process.

Figure 6:
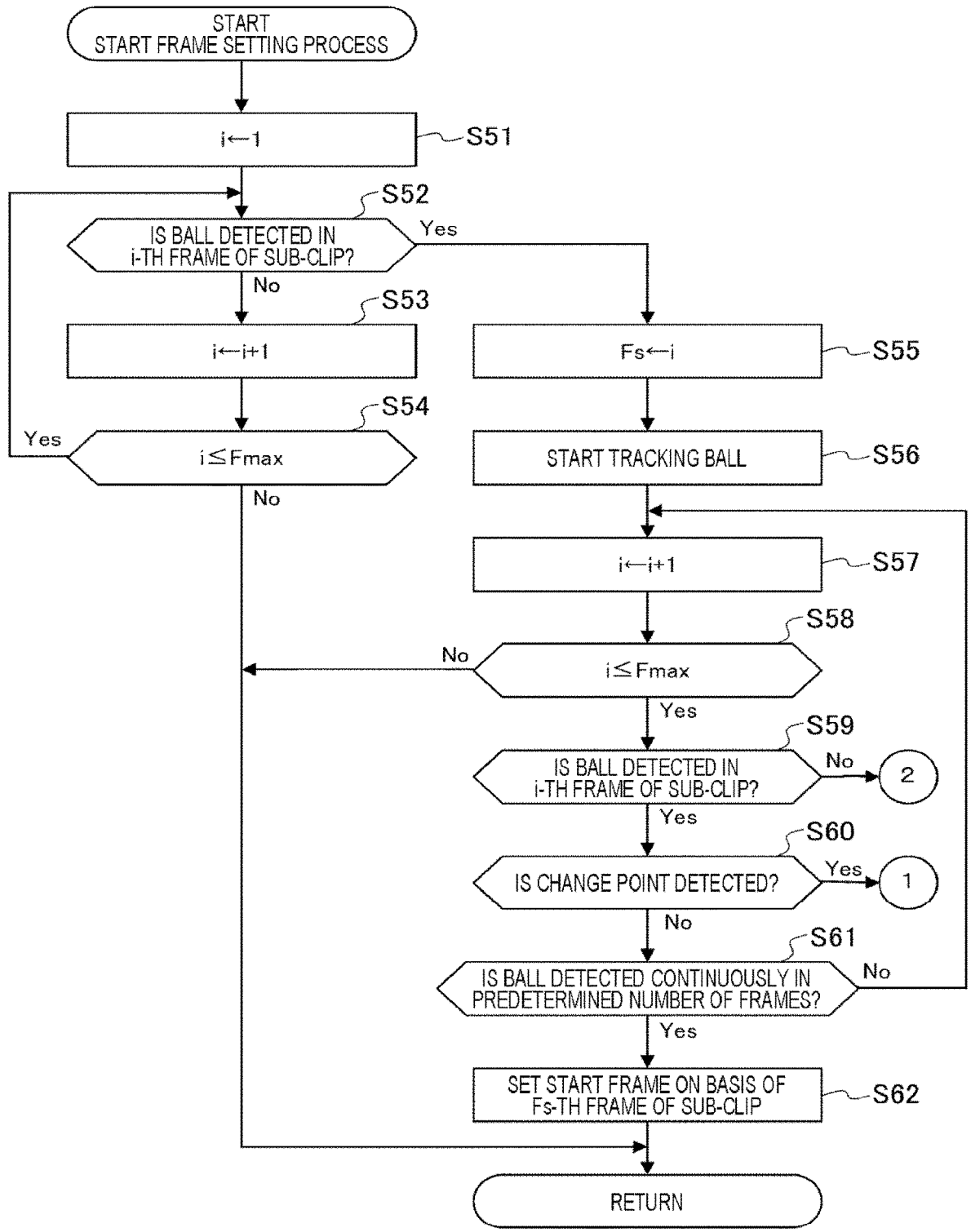
FIG. 6 is a flowchart for explaining details of a start frame setting process.
Figure 7:
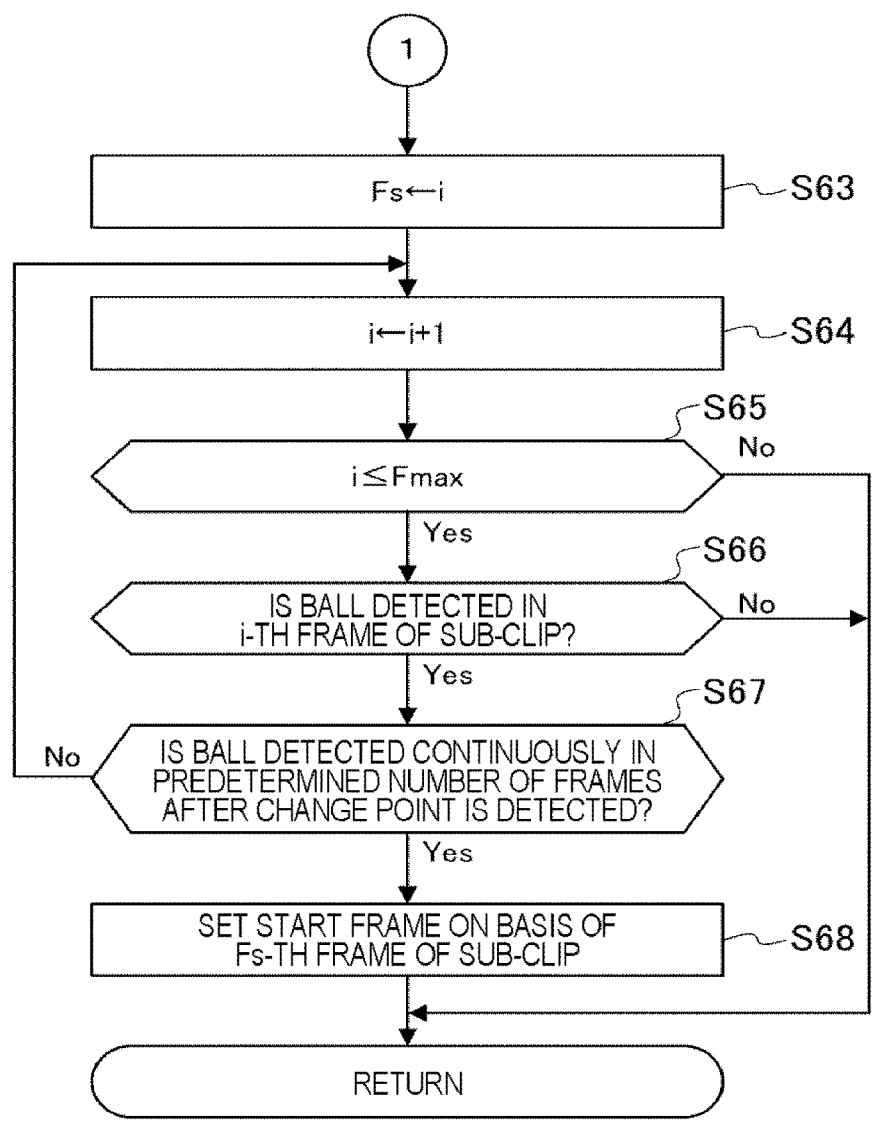
FIG. 7 is a flowchart for explaining details of the start frame setting process.
Figure 8:
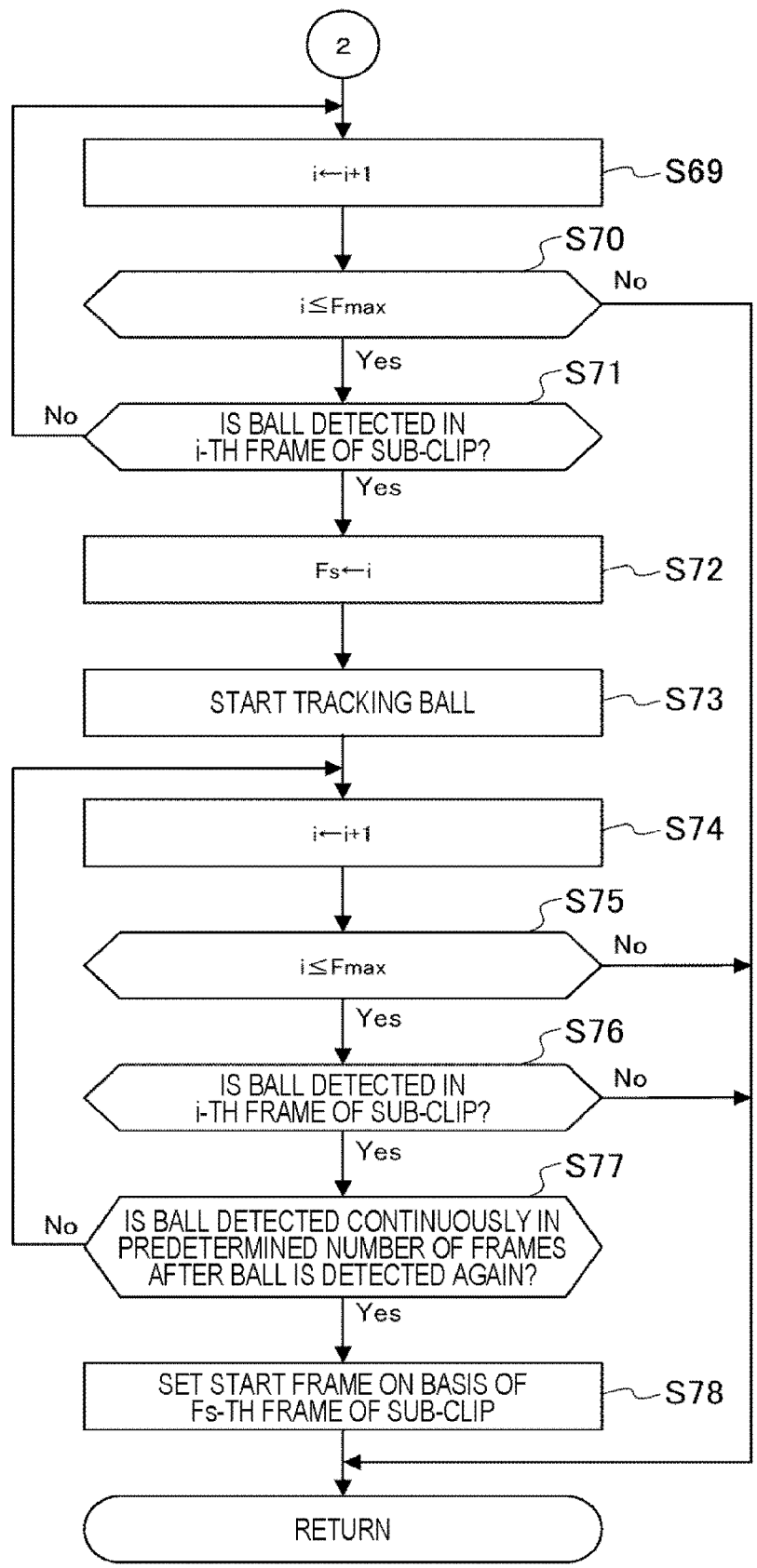
FIG. 8 is a flowchart for explaining details of the start frame setting process.

Here, details of the start frame setting process will be described with reference to the flowcharts of FIGS. 6 to 8.

In step S51, the analysis unit 121 sets 1 to a variable i.

In step S52, the analysis unit 121 determines whether or not the ball is detected in the i-th frame (hereinafter, referred to as a frame i) of the sub-clip. The analysis unit 121 searches for the ball in the frame i of the sub-clip. As a result, in a case where the analysis unit 121 determines that the ball cannot be detected in the frame i of the sub-clip, the processing proceeds to step S53.

In step S53, the analysis unit 121 increments the value of the variable i by one.

In step S54, the analysis unit 121 determines whether or not the variable i is equal to or less than the number of frames Fmax. In a case where it is determined that the variable i is equal to or less than the number of frames Fmax, the processing returns to step S52.

Thereafter, the processing of steps S52 to S54 is repeatedly executed until it is determined in step S52 that the ball is detected in the frame i of the sub-clip or it is determined in step S54 that the variable i exceeds the number of frames Fmax.

On the other hand, in a case where it is determined in step S54 that the variable i exceeds the number of frames Fmax, the start frame setting process ends. This is assumed to be a case where no ball is detected in all frames of the sub-clip, and the start frame is not set.

Furthermore, in a case where it is determined in step S52 that the ball is detected in the frame i of the sub-clip, the processing proceeds to step S55.

In step S55, the analysis unit 121 sets the value of the variable i to a variable Fs. That is, the number of the frame in which the ball first appears in the sub-clip is set to the variable Fs.

In step S56, the analysis unit 121 starts tracking the ball.

In step S57, the analysis unit 121 increments the value of the variable i by one.

In step S58, in a similar manner to the processing in step S54, it is determined whether or not the variable i is equal to or less than the number of frames Fmax. In a case where it is determined that the variable i is equal to or less than the number of frames Fmax, the processing proceeds to step S59.

In step S59, in a similar manner to the process of step S52, it is determined whether or not the ball is detected in the frame i of the sub-clip. In a case where it is determined that the ball is detected in the frame i of the sub-clip, the processing proceeds to step S60.

In step S60, the analysis unit 121 determines whether or not the change point is detected.

Figure 9:
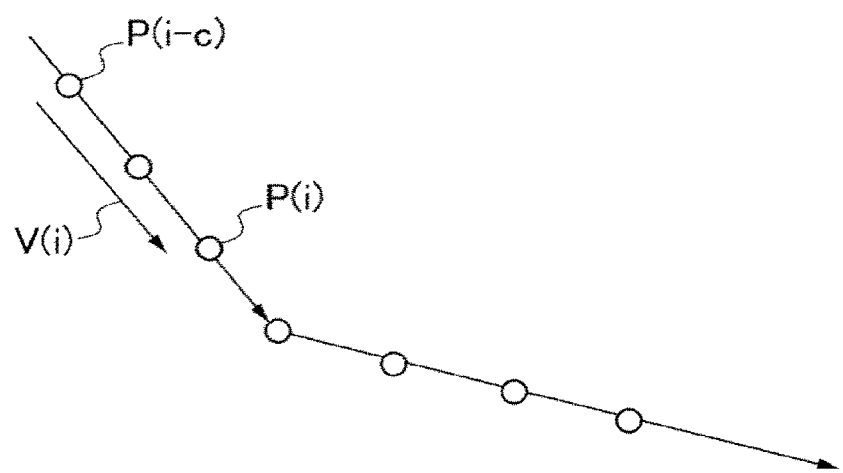
FIG. 9 is a diagram for explaining a method of detecting a change point in the trajectory of the ball.

Here, an example of a method of detecting the change point of the trajectory of the ball will be described with reference to FIG. 9.

The analysis unit 121 calculates a vector V(i) of the ball in the frame i by the following equation (1).

$$V(i)=P(i)-P(i-c) \qquad (1)$$

c is a constant. P(i) indicates the position of the ball in the frame i. P(i−c) indicates the position of the ball in a frame i−c, that is, c frames before the frame i.

Next, the analysis unit 121 calculates an angle θ(i) in the traveling direction of the ball in the frame i by the following equation (2).

$$\theta(i)=\tan^{-1}(V(i)\cdot y/V(i)\cdot x)\times(180/\pi) \qquad (2)$$

V(i)·x is the x component of the vector V(i), and V(i)·y is the y component of the vector V(i).

Next, the analysis unit 121 calculates a change amount Δθ(i) in the traveling direction between the frame i and the frame i−1 by the following equation (3).

$$\Delta\theta(i)=|\theta(i)-\theta(i-1)| \qquad (3)$$

Note that the change point of the ball is normally detected in the frame after the moment of the impact of the ball by the above-described equations (1) to (3).

Furthermore, when the constant c in the equation (1) decreases, it is possible to detect the change point at a position closer to the position of the impact of the ball. On the other hand, when the constant c increases, erroneous detection of the change point can be more reliably prevented.

In a case where the change amount Δθ(i) is equal to or greater than a predetermined threshold value, that is, in a case where the traveling direction of the ball changes by a predetermined angle or more, the analysis unit 121 determines that the position P(i) of the ball in the frame i of the sub-clip is the change point. On the other hand, in a case where the change amount Δθ(i) is less than the predetermined threshold value, and in a case where the traveling direction of the ball does not change by the threshold value or more, the analysis unit 121 determines that the position P(i) of the ball in the frame i of the sub-clip is not the change point.

Then, in a case where the change amount Δθ(i) is less than the predetermined threshold value, the analysis unit 121 determines that the change point is not detected, and the processing proceeds to step S61.

In step S61, the analysis unit 121 determines whether or not the ball is detected continuously in a predetermined number of frames. In a case where it is determined that the ball is not yet detected continuously in the predetermined number of frames, the processing returns to step S57.

Note that the predetermined number of frames is set to be equal to or more than the minimum number of frames required for analyzing the rotation characteristic of the ball, for example.

Thereafter, the processing of steps S57 to S61 is repeatedly executed until it is determined in step S58 that the variable i exceeds the number of frames Fmax, it is determined in step S59 that the ball cannot be detected in the frame i of the sub-clip, it is determined in step S60 that the change point is detected, or it is determined in step S61 that the ball is detected continuously in the predetermined number of frames.

On the other hand, in a case where it is determined in step S61 that the ball is detected continuously in the predetermined number of frames, the processing proceeds to step S62.

Figure 10:
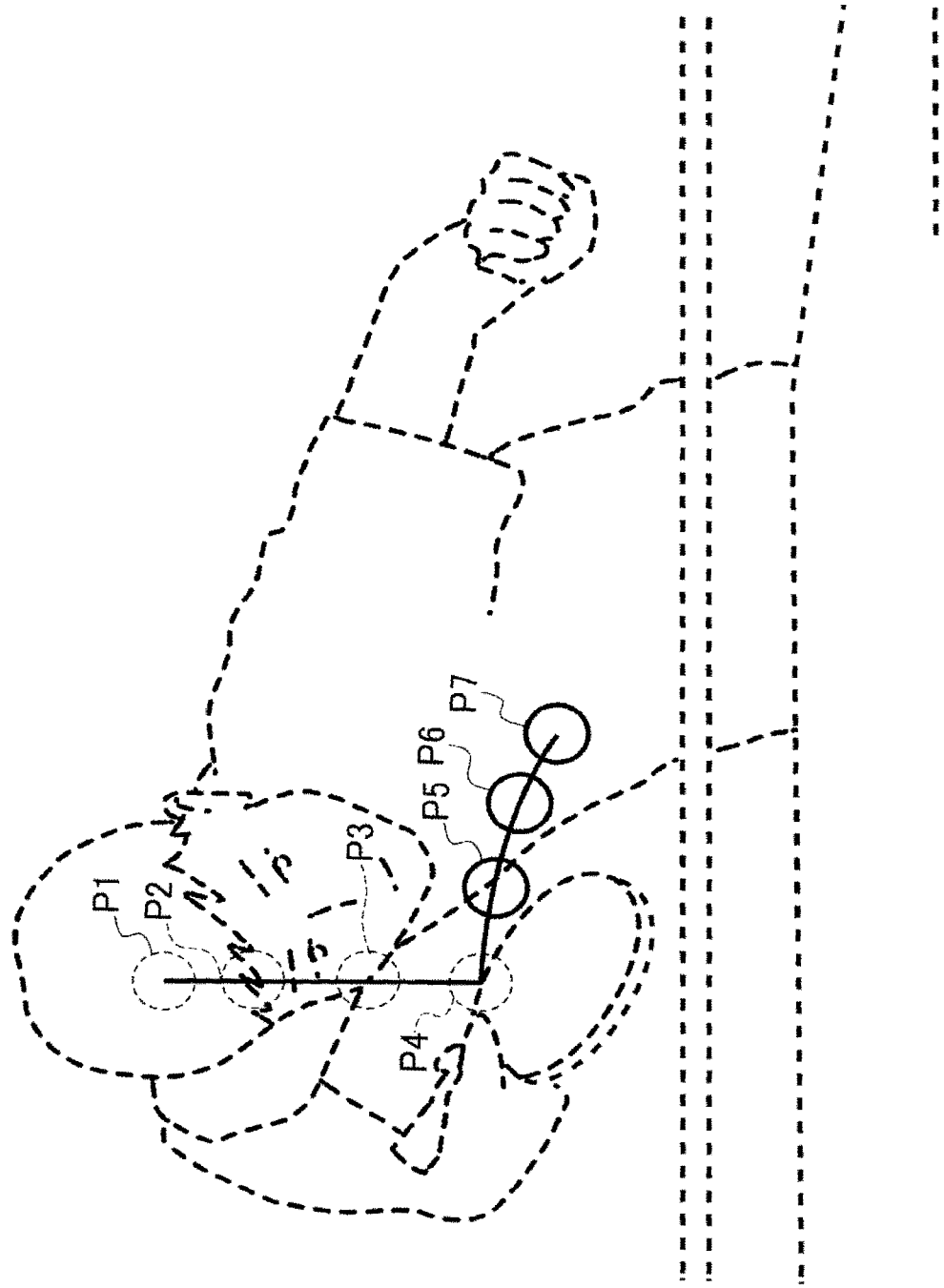
FIG. 10 is a diagram for explaining a method of setting a start frame.

This is assumed to be a case where the ball is detected continuously in the predetermined number of frames without detecting the change point after the ball is first detected in the sub-clip. For example, a case is assumed in which in the sub-clip, the ball does not appear due to being hidden behind the player and the like before hitting the serve and at the moment of the impact, and the ball continuously appears after the serve is hit. Specifically, for example, as schematically illustrated in FIG. 10, a case is assumed in which the ball does not appear until reaching the position P5 in the sub-clip, and the ball continuously appears after reaching the position P5.

In step S62, the start frame setting unit 123 sets the start frame on the basis of the Fs-th frame (frame Fs) of the sub-clip.

Specifically, the analysis unit 121 notifies the start frame setting unit 123 that the ball is detected continuously in the predetermined number of frames from the frame Fs of the sub-clip.

For example, the start frame setting unit 123 sets, as the start frame, the frame Fs of the sub-clip. That is, for example, a frame in which the ball first appears after finishing hitting the serve is set as the start frame. Therefore, among the frames in which the ball appears in the sub-clip, the frame closest to the moment of impact of the serve (a frame near the moment of the impact) after the moment of the impact of the serve is set as the start frame.

The start frame setting unit 123 supplies information indicating the set start frame to the analysis unit 121.

Thereafter, the start frame setting process ends.

On the other hand, in step S60, in a case where the change amount Δθ(i) is equal to or greater than the predetermined threshold value, the analysis unit 121 determines that the change point is detected, and the processing proceeds to step S63.

In step S63, the analysis unit 121 sets the value of the variable i to the variable Fs. That is, the number of the frame in which the change point of the ball is detected in the sub-clip is set to the variable Fs.

In step S64, the analysis unit 121 increments the value of the variable i by one.

In step S65, in a similar manner to the processing in step S54, it is determined whether or not the variable i is equal to or less than the number of frames Fmax. In a case where it is determined that the variable i is equal to or less than the number of frames Fmax, the processing proceeds to step S66.

In step S66, in a similar manner to the process of step S52, it is determined whether or not the ball is detected in the frame i of the sub-clip. In a case where it is determined that the ball is detected in the frame i of the sub-clip, the processing proceeds to step S67.

In step S67, the analysis unit 121 determines whether or not the ball is detected continuously in the predetermined number of frames after the change point is detected. In a case where it is determined that the ball is not yet detected continuously in the predetermined number of frames after the change point is detected, the processing returns to step S64.

Note that the predetermined number of frames is set to be equal to or more than the minimum number of frames required for analyzing the rotation characteristic of the ball, for example.

Thereafter, the processing of steps S64 to S67 is repeatedly executed until it is determined in step S65 that the variable i exceeds the number of frames Fmax, it is determined in step S66 that the ball cannot be detected in the frame i of the sub-clip, or it is determined in step S67 that the ball is detected continuously in the predetermined number of frames after the change point is detected.

On the other hand, in a case where it is determined in step S67 that the ball is detected continuously in the predetermined number of frames after the change point is detected, the processing proceeds to step S68.

For example, as illustrated in FIG. 5 described above, this is assumed to be a case where in the sub-clip, the ball appears continuously from before hitting the serve to after finishing the hitting, and the ball is detected continuously in the predetermined number of frames after the impact of the serve.

In step S68, the start frame setting unit 123 sets the start frame on the basis of the Fs-th frame (frame Fs) of the sub-clip.

Specifically, the analysis unit 121 notifies the start frame setting unit 123 that the ball is detected continuously in the predetermined number of frames after the change point is detected in the frame Fs of the sub-clip.

For example, the start frame setting unit 123 sets, as the start frame, a frame which is the predetermined of frames before (for example, one frame before) the frame Fs of the sub-clip. Therefore, for example, a frame which captures the moment of the impact of the serve or immediately after the moment is set as the start frame.

The start frame setting unit 123 supplies information indicating the set start frame to the analysis unit 121.

Thereafter, the start frame setting process ends.

On the other hand, in a case where it is determined in step S66 that the ball cannot be detected in the frame i of the sub-clip, the start frame setting process ends. For example, this is assumed to be a case where the ball cannot be detected continuously in the predetermined number of frames after the change point is detected, and the start frame is not set.

Furthermore, in a case where it is determined in step S65 that the variable i exceeds the number of frames Fmax, the start frame setting process ends. This is assumed to be a case where the sub-clip ends before the ball is detected continuously in the predetermined number of frames after the change point is detected, and the start frame is not set.

Moreover, in a case where it is determined in step S59 that the ball cannot be detected in the frame i of the sub-clip, the processing proceeds to step S69. This is assumed to be a case where the ball disappears in the sub-clip after the ball once appears.

In step S69, the analysis unit 121 increments the value of the variable i by one.

In step S70, in a similar manner to the processing in step S54, it is determined whether or not the variable i is equal to or less than the number of frames Fmax. In a case where it is determined that the variable i is equal to or less than the number of frames Fmax, the processing proceeds to step S71.

In step S71, in a similar manner to the process of step S52, it is determined whether or not the ball is detected in the frame i of the sub-clip. In a case where it is determined that the ball cannot be detected in the frame i of the sub-clip, the processing returns to step S69.

Thereafter, the processing of steps S69 to S71 is repeatedly executed until it is determined in step S70 that the variable i exceeds the number of frames Fmax or it is determined in step S71 that the ball is detected in the frame i of the sub-clip.

On the other hand, in a case where it is determined in step S71 that the ball is detected in the frame i of the sub-clip, the processing proceeds to step S72. This is assumed to be a case where the ball disappears once and then appears again in the sub-clip.

In step S72, the analysis unit 121 sets the value of the variable i to the variable Fs. That is, the number of the frame in which the ball appears again in the sub-clip is set to the variable Fs.

In step S73, the tracking of the ball is started in a similar manner to the processing in step S56.

In step S74, the analysis unit 121 increments the value of the variable i by one.

In step S75, in a similar manner to the processing in step S54, it is determined whether or not the variable i is equal to or less than the number of frames Fmax. In a case where it is determined that the variable i is equal to or less than the number of frames Fmax, the processing proceeds to step S76.

In step S76, in a similar manner to the process of step S52, it is determined whether or not the ball is detected in the frame i of the sub-clip. In a case where it is determined that the ball is detected in the frame i of the sub-clip, the processing proceeds to step S77.

In step S77, the analysis unit 121 determines whether or not the ball is detected continuously in the predetermined number of frames after the ball is detected again. In a case where it is determined that the ball is not yet detected continuously in the predetermined number of frames after the ball is detected again, the processing returns to step S74.

Note that the predetermined number of frames is set to be equal to or more than the minimum number of frames required for analyzing the rotation characteristic of the ball, for example.

Thereafter, the processing of steps S74 to S77 is repeatedly executed until it is determined in step S75 that the variable i exceeds the number of frames Fmax, it is determined in step S76 that the ball cannot be detected in the frame i of the sub-clip, or it is determined in step S77 that the ball is detected continuously in the predetermined number of frames after the ball is detected again.

On the other hand, in a case where it is determined in step S77 that the ball is detected continuously in the predetermined number of frames after the ball is detected again, the processing proceeds to step S78.

Figure 11:
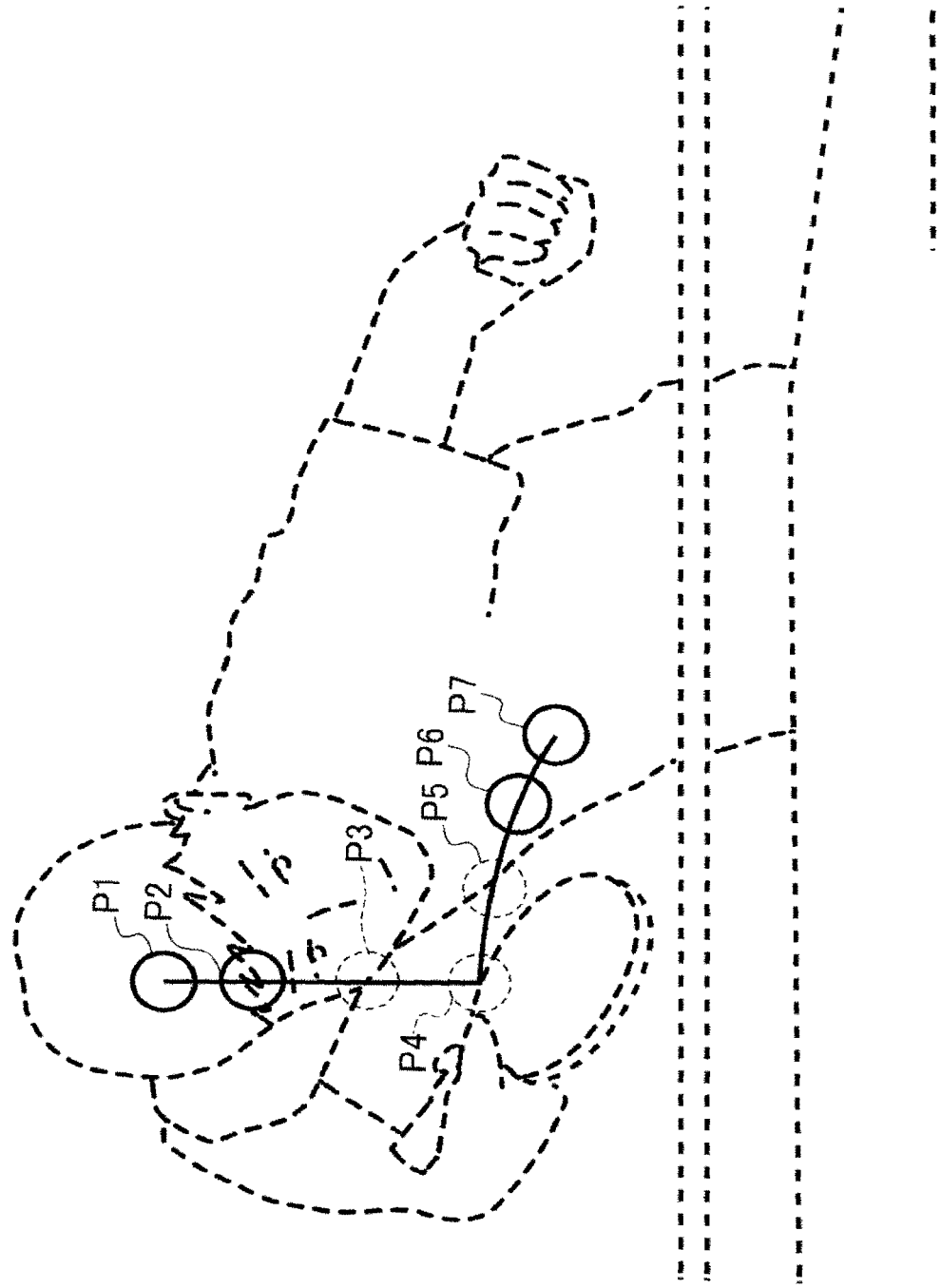
FIG. 11 is a diagram for explaining the method of setting the start frame.

For example, this is assumed to be a case where in the sub-clip, after the ball appears before the serve is hit, the ball disappears once due to being hidden behind the player and the like, and after the serve is hit, the ball appears again. Specifically, for example, as schematically illustrated in FIG. 11, a case is assumed in which, in the sub-clip, the ball appears at the position P1, then disappears at the position P3, and the ball again appears at the position P6.

In step S78, the start frame setting unit 123 sets the start frame on the basis of the Fs-th frame (frame Fs) of the sub-clip.

Specifically, the analysis unit 121 notifies the start frame setting unit 123 that the ball is detected continuously in the predetermined number of frames after the ball is detected in the frame Fs of the sub-clip.

For example, the start frame setting unit 123 sets, as the start frame, the frame Fs of the sub-clip. That is, for example, a frame in which the ball first appears after finishing hitting the serve is set as the start frame. Therefore, among the frames in which the ball appears in the sub-clip, the frame closest to the moment of the impact of the serve after the moment of the impact of the serve is set as the start frame.

The start frame setting unit 123 supplies information indicating the set start frame to the analysis unit 121.

Thereafter, the start frame setting process ends.

On the other hand, in a case where it is determined in step S76 that the ball cannot be detected in the frame i of the sub-clip, the start frame setting process ends. For example, this is assumed to be a case where the ball cannot be detected continuously in the predetermined number of frames after the ball is detected again in the sub-clip, and the start frame is not set.

Furthermore, in a case where it is determined in step S75 that the variable i exceeds the number of frames Fmax, the start frame setting process ends. This is assumed to be a case where in the sub-clip, the ball is detected again, and then the sub-clip ends before the ball is detected continuously in the predetermined number of frames, and the start frame is not set.

Moreover, in a case where it is determined in step S70 that the variable i exceeds the number of frames Fmax, the start frame setting process ends. This is assumed to be a case where the ball disappears and then is not detected again in the sub-clip, and the start frame is not set.

Furthermore, in a case where it is determined in step S58 that the variable i exceeds the number of frames Fmax, the start frame setting process ends. This is assumed to be a case where in the sub-clip, the ball is detected, and then the sub-clip ends before the ball is detected continuously in the predetermined number of frames, and the start frame is not set.

Returning to FIG. 4, in step S4, the analysis unit 121 determines whether or not the start frame is set, on the basis of the result of the processing in step S3. In a case where it is determined that the start frame is set, the processing proceeds to step S5.

In step S5, the analysis unit 121 executes a rotation characteristic analysis process.

Figure 12:
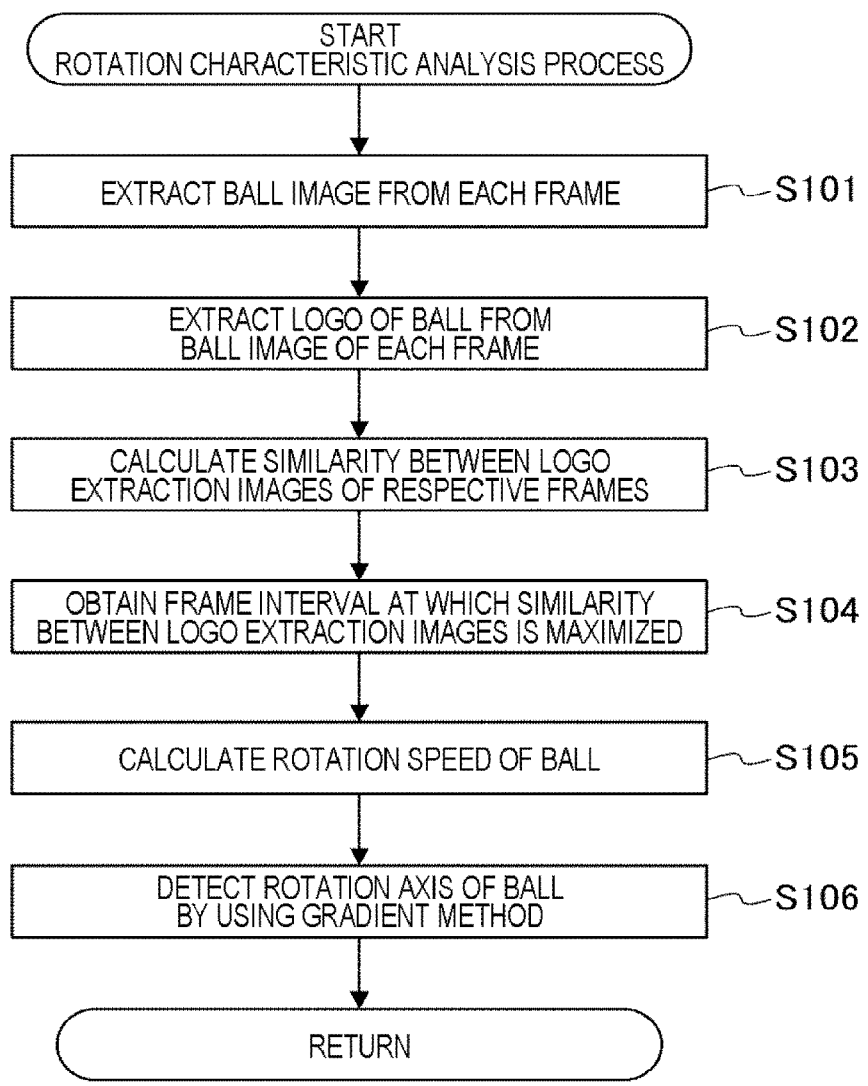
FIG. 12 is a flowchart for explaining details of a rotation characteristic analysis process.

Here, details of the rotation characteristic analysis process will be described with reference to the flowchart of FIG. 12.

In step S101, the analysis unit 121 extracts a ball image from each frame. Specifically, the analysis unit 121 detects a region where the ball is captured and the center point of the ball in each frame from the start frame of the sub-clip to the frame after the predetermined number of frames.

Note that the predetermined number of frames is set to be equal to or more than the minimum number of frames required for analyzing the rotation characteristic of the ball, for example.

The analysis unit 121 extracts, from each frame, an image of the region in which the ball is captured (hereinafter, referred to as a ball image) with the detected center point of the ball as the center. The analysis unit 121 adjusts the size of the ball image as necessary such that the size of the ball matches between the extracted ball images.

In step S102, the analysis unit 121 extracts the logo of the ball from the ball image of each frame. For example, the analysis unit 121 generates a logo extraction image obtained by extracting the logo of the ball from each ball image by performing a moving average difference, noise removal, and the like on each ball image. The logo extraction image is, for example, a binary image in which a portion of the logo is represented in white, and the other portions are represented in black.

In step S103, the analysis unit 121 calculates a similarity between the logo extraction images of respective frames. For example, the analysis unit 121 calculates the sum of the similarities between the logo extraction images of respective frames while changing a frame interval n. For example, zero means normalized cross correlation (ZNCC) is used to calculate the similarity.

In step S104, the analysis unit 121 obtains the frame interval at which the sum of the similarities between the logo extraction images is maximized.

Figure 13:
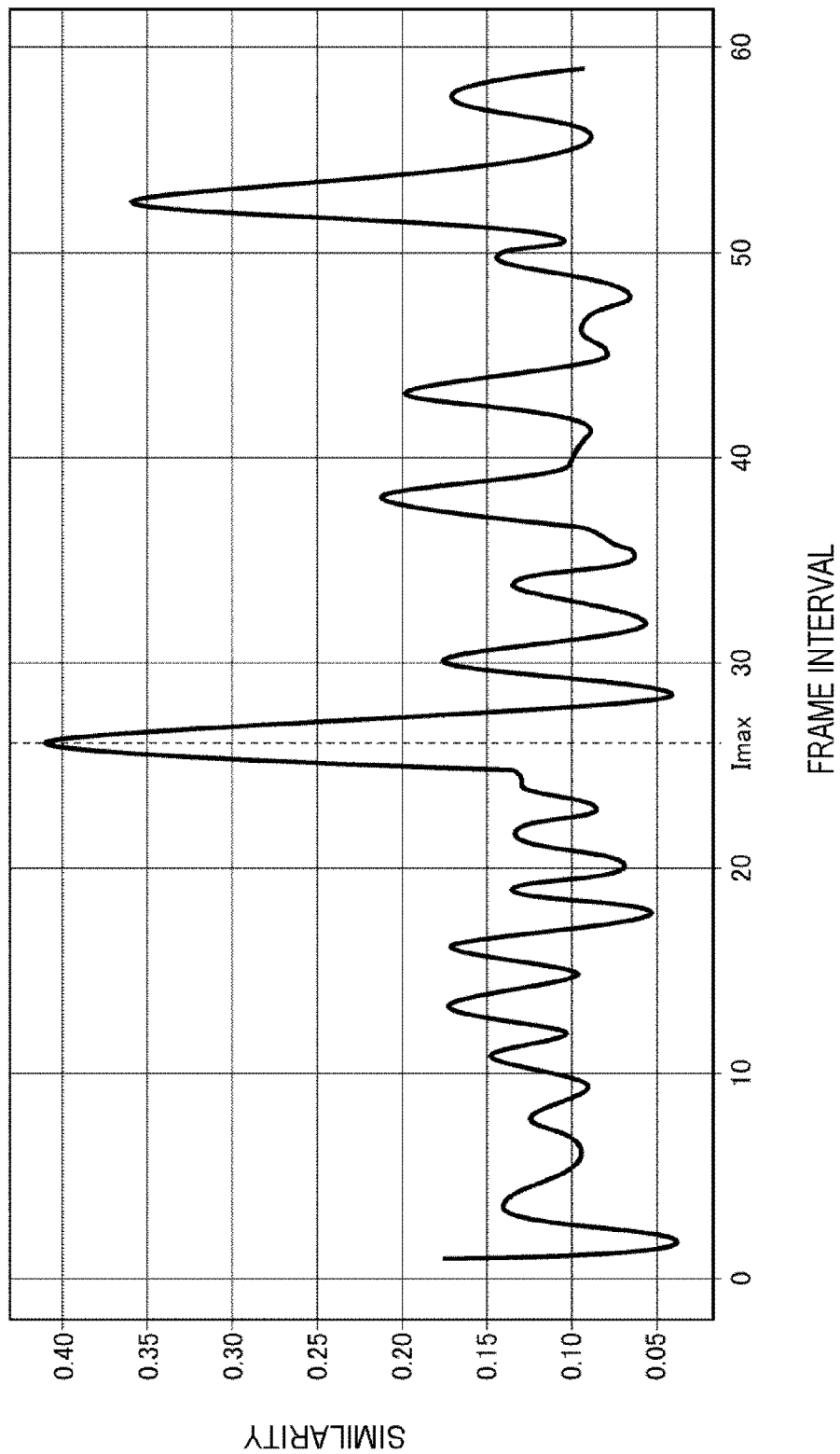
FIG. 13 is a graph illustrating an example of a calculation result of a similarity between logo extraction images of each frame.

FIG. 13 is a graph illustrating an example of the calculation result in a case where the ZNCC is used for the calculation of the similarity between the logo extraction images of respective frames. In FIG. 13, a horizontal axis represents the frame interval, and a vertical axis represents the sum of the similarities.

In the case of this example, a frame interval Imax at which the sum of the similarities between the logo extraction images of respective frames is maximum is 26.5.

In step S105, the analysis unit 121 calculates the rotation speed of the ball. Specifically, the analysis unit 121 calculates the rotation speed of the ball by dividing the frame rate of the sub-clip (captured moving image) by the frame interval obtained in the processing of step S104.

For example, in the case of the example of FIG. 13, when the frame rate of the sub-clip is 960 fps, the rotation speed of the ball is 36 rps ($\approx$960/26.5).

In step S106, the analysis unit 121 detects the rotation axis of the ball by using a gradient method.

For example, the analysis unit 121 generates a search rotation image obtained by rotating the ball image of each frame by one frame around a rotation axis $r(\theta, \varphi)$. Note that the rotation amount for one frame is calculated on the basis of the rotation speed calculated in the processing of step S105.

Then, the analysis unit 121 calculates the similarity between the search rotation image of each frame and the logo extraction image after one frame. For example, the sum of the similarity between the search rotation image of the first frame and the logo extraction image of the second frame, the similarity between the search rotation image of the second frame and the logo extraction image of the third frame, . . . , and the similarity between the search rotation image of the n−1-th frame and the logo extraction image of the n-th frame is calculated. The analysis unit 121 calculates the sum of the similarities for each rotation axis $r(\theta, \varphi)$ while changing the rotation axis $r(\theta, \varphi)$.

Next, the analysis unit 121 searches for the rotation axis $r(\theta, \varphi)$ at which the sum of the similarities is maximum by using the gradient method, and estimates the rotation axis $r(\theta, \varphi)$ at which the sum of the similarities is maximum as the rotation axis of the ball.

Furthermore, the analysis unit 121 estimates the rotation direction of the ball on the basis of the movement direction of the logo in the logo extraction image.

The analysis unit 121 supplies, to the image processing unit 124, information indicating the rotation speed, the rotation axis, and the rotation direction of the ball, and the start frame.

Thereafter, the rotation characteristic analysis process ends.

Returning to FIG. 4, in step S6, the image processing unit 124 combines the rotation characteristic information with the moving image.

For example, the image processing unit 124 generates information requesting transmission of the captured moving image, and transmits the information to the server 12 via the communication unit 102 and the network 21.

On the other hand, the image processing unit 61 of the server 12 receives the information requesting transmission of the captured moving image via the communication unit 51. The image processing unit 61 reads the captured image from the storage unit 53, and transmits the captured image to the information processing apparatus 13 via the communication unit 51 and the network 21.

On the other hand, the image processing unit 124 of the information processing apparatus 13 receives the captured moving image via the communication unit 102. The image processing unit 124 detects a frame corresponding to the start frame in the captured moving image. Then, the image processing unit 124 superimposes the rotation characteristic information indicating the rotation characteristic of the serve in the vicinity of the detected frame.

The rotation characteristic information includes, for example, a display effect indicating the rotation characteristic of the serve, a numerical value, and the like.

Note that, for example, it is also possible to superimpose the rotation characteristic information on the sub-clip. Furthermore, for example, the image processing unit 124 of the information processing apparatus 13 may acquire a captured moving image in a predetermined range before and after the start frame from the server 12, and superimpose the rotation characteristic information.

Thereafter, the moving image editing process ends.

On the other hand, in a case where it is determined in step S4 that the start frame is not set, the processing in steps S5 and S6 is skipped, and the moving image editing process ends. That is, the analysis of the rotation characteristic of the ball and the combination of the rotation characteristic information into the moving image are not performed due to the setting error of the start frame.

As described above, the rotation characteristic of the ball can be easily analyzed.

Specifically, the extraction range of the sub-clip is set by using the LFR moving image of a low frame rate, and the start frame is set by using the sub-clip. Therefore, the processing is reduced as compared with a case where the start frame is set by using the captured moving image of a high frame rate, and the start frame can be set more quickly.

Furthermore, even when a sensor is not attached to a player, a racket, and the like, the moment of the impact of the serve can be easily detected in the captured moving image (sub-clip) of a high frame rate.

Moreover, in the captured moving image, even when the ball disappears at the moment of the impact of the serve due to the shadow of the player and the like, the frame closest to the moment of the impact of the serve is set as the start frame. As a result, the accuracy of analyzing the rotation characteristic of the serve is improved.

2. Modifications

Hereinafter, modifications of the above-described embodiment of the present technology will be described.

In the above description, the example of analyzing the rotation characteristic of the serve in table tennis has been described, but the present technology can also be applied to the case of analyzing the rotation characteristic of a smash, a drive, a cut, and the like in table tennis. That is, the present technology can also be applied to the case of analyzing a rotation characteristic immediately after the impact of a ball other than the serve in table tennis.

Furthermore, the present technology can also be applied to the case of analyzing a rotation characteristic immediately after the impact of a ball in a ball game other than table tennis. For example, the present technology can also be applied to the case of analyzing a rotation characteristic immediately after the impact of a ball in tennis, badminton, baseball, ice hockey, and the like. Furthermore, for example, the present technology can also be applied to the case of analyzing a rotation characteristic immediately after the impact of a ball in a ball game such as volleyball and soccer in which the ball is hit (including kicking or the like) by a human body without using a tool.

Moreover, the present technology can also be applied to the case of detecting rotation characteristic immediately after the impact of a ball in a ball game such as golf or billiards in which a stopped ball is hit.

Furthermore, for example, the present technology can also be applied to the case of analyzing a rotation characteristic of a thrown ball in a ball game such as bowling or darts in which a player throws the ball.

Moreover, the present technology can also be applied to a case where the sub-clip is used for image analysis other than the analysis of the rotation characteristic of the ball. For example, a case is assumed in which the before and after the impact of the ball are the highlight of a ball game scene. Therefore, for example, the present technology can be applied to a case where the sub-clip is extracted as the highlight scene of sports.

3. Others

<Configuration Example of Computer>

The above-described series of processing can be executed by hardware or software. In a case where the series of processing is executed by software, a program configuring the software is installed in a computer. Here, the computer includes a computer incorporated in dedicated hardware, a general-purpose personal computer capable of executing various functions by installing various programs, and the like, for example.

Figure 14:
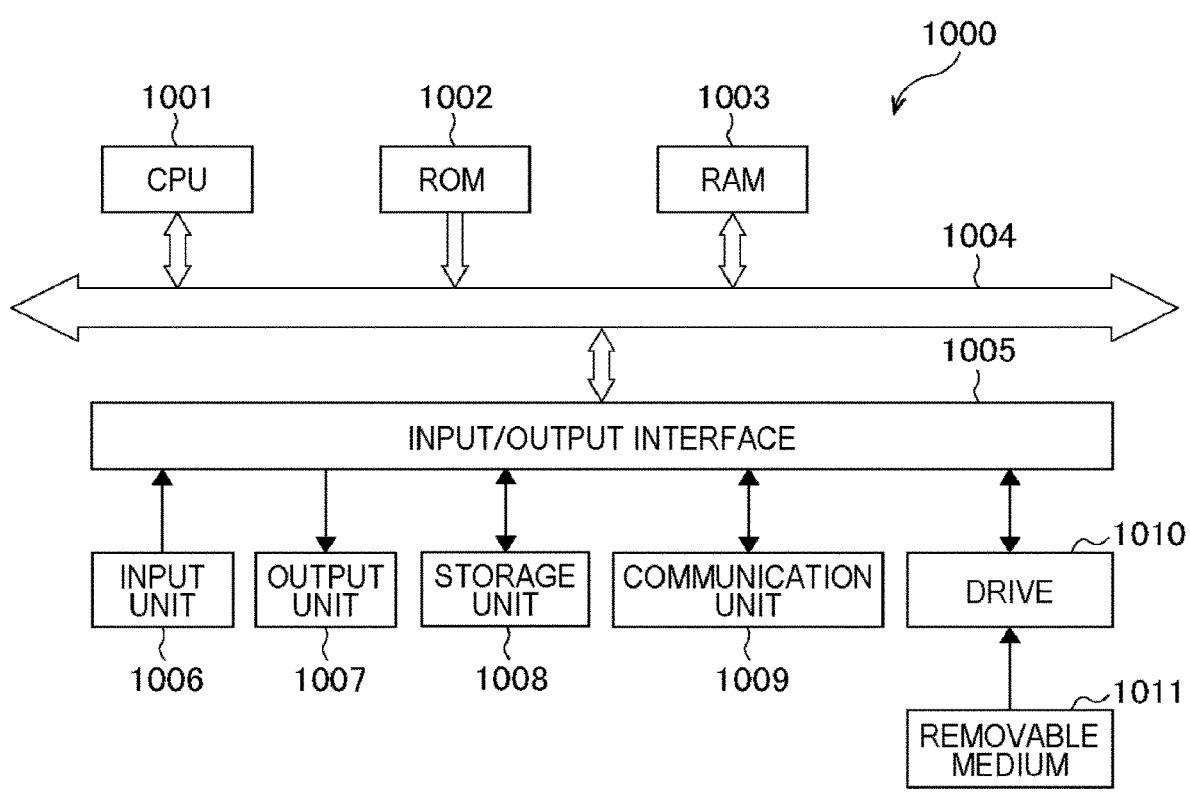
FIG. 14 is a diagram illustrating a configuration example of a computer.

FIG. 14 is a block diagram illustrating a configuration example of the hardware of the computer that executes the above-described series of processing by the program.

In a computer 1000, a central processing unit (CPU) 1001, a read only memory (ROM) 1002, and a random access memory (RAM) 1003 are mutually connected by a bus 1004.

Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disk, a magneto-optical disk, or a semiconductor memory.

In the computer 1000 configured as described above, the above-described series are performed, for example, in such a manner that the CPU 1001 loads the program recorded in the recording unit 1008 into the RAM 1003 via the input/output interface 1005 and the bus 1004 and executes the program.

For example, the program executed by the computer 1000 (CPU 1001) can be recorded and provided on the removable medium 1011 as a package medium and the like. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 in the drive 1010. Furthermore, the program can be received by the communication unit 1009 and installed in the recording unit 1008 via a wired or wireless transmission medium. In addition, the program can be installed in advance in the ROM 1002 or the recording unit 1008.

Note that the program executed by the computer may be a program in which processing is performed in time series in the order described in this description or a program in which processing is performed in parallel or at a necessary timing such as when a call is made.

Furthermore, in this description, the system means a set of a plurality of components (devices, modules (parts) and the like), and it does not matter whether or not all the components are in the same housing. Therefore, both a plurality of devices which is housed in separate housings and connected via a network and one device in which a plurality of modules is housed in one housing are systems.

Moreover, the embodiment of the present technology is not limited to the above-described embodiment, and various modifications can be made without departing from the gist of the present technology.

For example, the present technology can be configured as cloud computing in which one function is shared by a plurality of devices via a network and jointly processed.

Furthermore, each step described in the above-described flowcharts can be executed by one device or shared by a plurality of devices.

Moreover, in a case where one step includes a plurality of processes, the plurality of processes included in the one step can be executed by one device or shared by a plurality of devices.

<Combination Example of Configuration>

The present technology can also have the following configurations.

(1)

An information processing apparatus including:

an analysis unit that detects a trajectory of a ball in a first moving image; and a start frame setting unit that sets a start frame for starting predetermined processing among frames of the first moving image on the basis of a detection result of the trajectory of the ball in the first moving image.

(2)

The information processing apparatus according to (1), in which the analysis unit detects a change point at which a traveling direction of the ball changes by a predetermined angle or more in the first moving image, and the start frame setting unit sets the start frame on the basis of a frame in which the change point is detected.

(3)

The information processing apparatus according to (2), in which the start frame is a frame that captures a moment of impact of the ball or a frame near the moment of the impact of the ball.

(4)

The information processing apparatus according to (2) or (3), in which in a case where the change point is not detected in the first moving image, the start frame setting unit sets the start frame on the basis of a head frame in a range in which the ball is detected continuously in a predetermined number of frames or more in the first moving image.

(5)

The information processing apparatus according to any one of (2) to (4), in which in a case where the ball is not detected continuously in a predetermined number of frames or more in the first moving image, the start frame setting unit does not set the start frame.

(6)

The information processing apparatus according to any one of (1) to (5), in which the first moving image is extracted from a second moving image generated by a captured image obtained by imaging a play in a ball game.

(7)

The information processing apparatus according to (6), further including:

an extraction range setting unit that sets an extraction range for extracting the first moving image from the second moving image on the basis of a third moving image having a frame rate lower than a frame rate of the first moving image.

(8)

The information processing apparatus according to (7), in which the analysis unit analyzes the third moving image, and the extraction range setting unit sets the extraction range on the basis of an analysis result of the third moving image.

(9)

The information processing apparatus according to (8), in which the analysis unit detects a trajectory of the ball in the third moving image, and the extraction range setting unit sets the extraction range on the basis of a detection result of the trajectory of the ball in the third moving image.

(10)

The information processing apparatus according to (9), in which the analysis unit detects a change point at which a traveling direction of the ball changes by a predetermined angle or more in the third moving image, and the extraction range setting unit sets the extraction range on the basis of a frame in which the change point is detected.

(11)

The information processing apparatus according to any one of (8) to (10), in which the analysis unit recognizes at least one of an action or a posture of a player on the basis of the third moving image, and the extraction range setting unit sets the extraction range on the basis of a recognition result of at least one of the action or the posture of the player.

(12)

The information processing apparatus according to any one of (7) to (11), in which the analysis unit analyzes a sound corresponding to the third moving image, and the extraction range setting unit sets the extraction range on the basis of an analysis result of the sound.

(13)

The information processing apparatus according to any one of (7) to (12), in which the third moving image is generated on the basis of the second moving image.

(14)

The information processing apparatus according to any one of (1) to (13), in which the predetermined processing is image analysis.

(15)

The information processing apparatus according to (14), in which the image analysis is analysis of a rotation characteristic of the ball.

(16)

The information processing apparatus according to (15), in which the image analysis is analysis of a rotation characteristic of a serve in table tennis.

(17)

The information processing apparatus according to (15) or (16), in which the analysis unit analyzes the rotation characteristic of the ball.

(18)

The information processing apparatus according to any one of (1) to (17), in which the ball is a table tennis ball.

(19)

An information processing method performed by an information processing apparatus, the method including:

detecting a trajectory of a ball in a moving image; and setting a start frame for starting predetermined processing among frames of the moving image on the basis of a detection result of the trajectory of the ball in the moving image.

(20)

A program for causing a computer to execute a process including:

detecting a trajectory of a ball in a moving image; and setting a start frame for starting predetermined processing among frames of the moving image on the basis of a detection result of the trajectory of the ball in the moving image.

Note that the effects described in this description are merely examples and are not limited, and other effects may be provided.

REFERENCE SIGNS LIST

1 Information processing system
11 Camera
12 Server
13 Information processing apparatus
52 Information processing unit
61 Image processing unit
103 Information processing unit
121 Analysis unit
122 Extraction range setting unit
123 Start frame setting unit
124 Image processing unit

The invention claimed is:

1. An information processing apparatus, comprising:
processing circuitry configured to
detect a trajectory of a ball in a first moving image; and
set a start frame for starting predetermined processing among frames of the first moving image based on a detection result of the trajectory of the ball in the first moving image,
wherein the processing circuitry is further configured to,
in response to determining that a change in direction of the ball is not detected, count a number of consecutive frames in a sequence in which the ball is continuously detected in the first moving image, and set the start frame in response to determining that the counted number of consecutive frames in the sequence is greater than or equal to a predetermined threshold number.

2. The information processing apparatus according to claim 1, wherein the processing circuitry is further configured to
detect a change point at which a traveling direction of the ball changes by a predetermined angle or more in the first moving image, and
set the start frame based on a frame in which the change point is detected.

3. The information processing apparatus according to claim 2, wherein the start frame set by the processing circuitry is a frame that captures a moment of impact of the ball or a frame near the moment of the impact of the ball.

4. The information processing apparatus according to claim 1, wherein the processing circuitry is further configured to set the start frame to be a first frame in the sequence.

5. The information processing apparatus according to claim 2, wherein in response to determining that the counted number is less than the predetermined threshold number, the processing circuitry is configured to not set the start frame.

6. The information processing apparatus according to claim 1, wherein the processing circuitry is further configured to extract the first moving image from a second moving image generated by a captured image obtained by imaging a play in a ball game.

7. The information processing apparatus according to claim 6, wherein the processing circuitry is further configured to set an extraction range for extracting the first moving image from the second moving image based on a third moving image having a frame rate lower than a frame rate of the first moving image.

8. The information processing apparatus according to claim 7, wherein the processing circuitry is further config-
ured to analyze the third moving image, and set the extraction range based on an analysis result of the third moving image.

9. The information processing apparatus according to claim 8, wherein the processing circuitry is further configured to detect a trajectory of the ball in the third moving image, and set the extraction range based on a detection result of the trajectory of the ball in the third moving image.

10. The information processing apparatus according to claim 9, wherein the processing circuitry is further configured to detect a change point at which a traveling direction of the ball changes by a predetermined angle or more in the third moving image, and set the extraction range based on a frame in which the change point is detected.

11. The information processing apparatus according to claim 8, wherein the processing circuitry is further configured to recognize at least one of an action or a posture of a player based on the third moving image, and set the extraction range based on a recognition result of at least one of the action or the posture of the player.

12. The information processing apparatus according to claim 7, wherein the processing circuitry is further configured to analyze a sound corresponding to the third moving image, and set the extraction range based on an analysis result of the sound.

13. The information processing apparatus according to claim 7, wherein the processing circuitry is further configured to generate the third moving image based on the second moving image.

14. The information processing apparatus according to claim 1, wherein the predetermined processing, which is performed by the processing circuitry, is image analysis.

15. The information processing apparatus according to claim 14, wherein the image analysis performed by the processing circuitry is analysis of a rotation characteristic of the ball.

16. The information processing apparatus according to claim 15, wherein the image analysis performed by the processing circuitry is analysis of a rotation characteristic of a serve in table tennis.

17. The information processing apparatus according to claim 15, wherein the processing circuitry is further configured to analyze the rotation characteristic of the ball.

18. The information processing apparatus according to claim 1, wherein the ball, whose trajectory is detected by the processing circuitry, is a table tennis ball.

19. An information processing method performed by an information processing apparatus, the method comprising:
detecting a trajectory of a ball in a moving image;
in response to determining that a change in direction of the ball is not detected, count a number of consecutive frames in a sequence in which the ball is continuously detected in the first moving image; and
setting a start frame for starting predetermined processing among frames of the moving image based on a detection result of the trajectory of the ball in the moving image,
wherein the setting step comprises setting the start frame in response to determining that the counted number of consecutive frames in the sequence is greater than or equal to a predetermined threshold number.

20. A non-transitory computer-readable medium storing a program that when executed by a computer, causes the computer to execute a process comprising:
detecting a trajectory of a ball in a moving image;
in response to determining that a change in direction of the ball is not detected, count a number of consecutive frames in a sequence in which the ball is continuously detected in the first moving image; and setting a start frame for starting predetermined processing among frames of the moving image on a basis of a detection result of the trajectory of the ball in the moving image, wherein the setting step comprises setting the start frame in response to determining that the counted number of consecutive frames in the sequence is greater than or equal to a predetermined threshold number.

* * * * *